United States Patent [19]

O'Rourke

[11] Patent Number: 4,537,422
[45] Date of Patent: Aug. 27, 1985

[54] SEALING SYSTEM FOR ROAD WHEEL SUSPENSION

[75] Inventor: Glenn R. O'Rourke, Lake Orion, Mich.

[73] Assignee: Ex-Cell-O Corporation, Troy, Mich.

[21] Appl. No.: 539,782

[22] Filed: Oct. 7, 1983

[51] Int. Cl.³ .............................................. B60G 11/26
[52] U.S. Cl. ................................... 280/705; 188/297; 188/314; 267/64.11; 277/103; 280/698; 280/709
[58] Field of Search .............. 280/683, 698, 702, 705, 280/709; 267/64.11, 126, 136; 188/297, 314; 277/33, 103, 135, DIG. 8

[56] References Cited

U.S. PATENT DOCUMENTS

| | | | |
|---|---|---|---|
| 3,129,948 | 4/1964 | Kendall | 277/103 |
| 3,879,023 | 4/1975 | Pearce et al. | 267/64.11 |
| 4,447,073 | 5/1984 | Brandstadter | 280/705 |

Primary Examiner—Joseph F. Peters, Jr.
Assistant Examiner—Kenneth R. Rice
Attorney, Agent, or Firm—John C. Evans

[57] ABSTRACT

A hydropneumatic suspension unit includes a large diameter flanged road arm spindle which is bolted to the vehicle hull; a road arm has one end rotatably mounted on the road arm spindle and another end mounting a road wheel; a gravity oriented oil barrier is defined with a free volume enclosed within the road arm to submerge a sealing system for an in-arm mechanically operated pneumatic spring which has a gas volume trapped behind the oil barrier to support the sprung mass of the vehicle; the seal system is defined by a pair of spaced O-rings and a packing ring which seals the outer surface of a reciprocating rod that displaces the seal oil barrier to vary gas compression and produce a resultant force equivalent to pressure times the area of the rod to counteract vertical forces on the road wheel.

6 Claims, 6 Drawing Figures

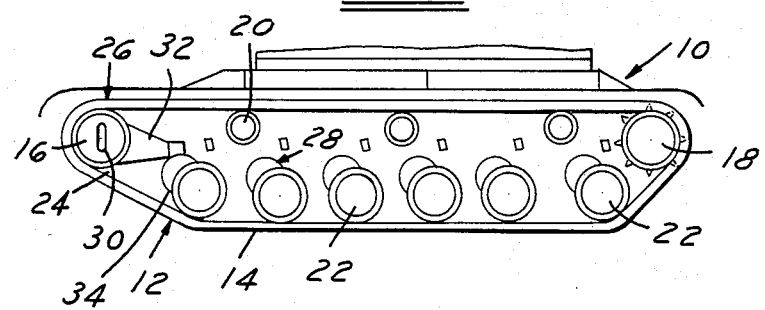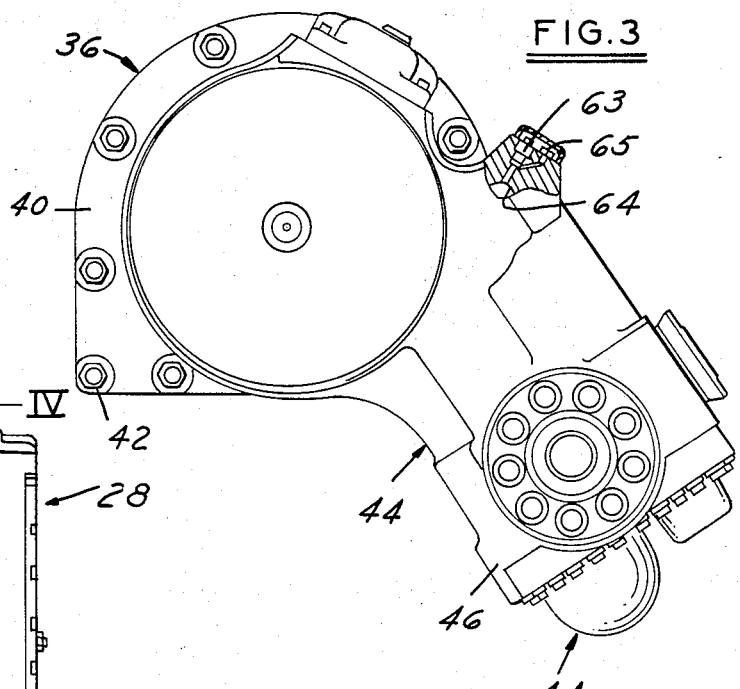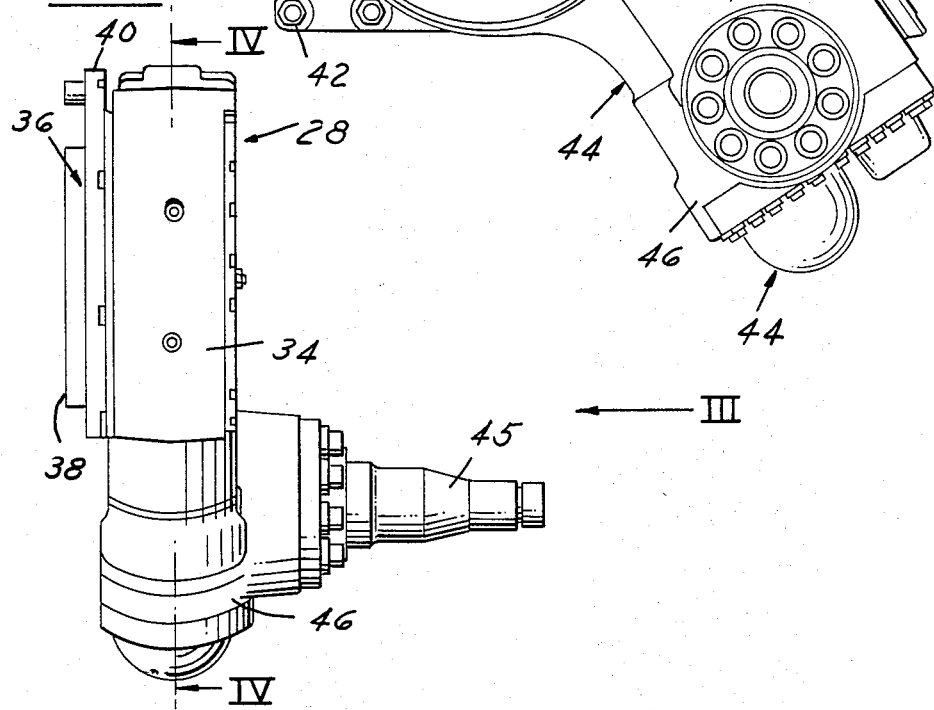

SEALING SYSTEM FOR ROAD WHEEL SUSPENSION

FIELD OF THE INVENTION

This invention relates to a self-contained externally mounted hydropneumatic suspension with gas spring and integral damper; more particularly to such units having an in-arm gas spring with means for sealing the high pressure pneumatic spring volume of the unit.

DESCRIPTION OF THE PRIOR ART

Hydropneumatic suspension systems for multiple wheeled vehicles have a hydropneumatic suspension unit (HSU) for each individual wheel. These HSU's in the past consisted of a gas-fluid spring to support the weight of the vehicle and a restriction to the fluid flow to damp the vehicle. These HUS's were either hull mounted or built into the road arm.

Such hydropneumatic suspension systems have utilized either hull mounted or in-arm self-contained HUS's. These systems are capable of retrofitting existing vehicles which do not contain a suitable hydraulic supply. They are also suitable for new applications where a high performance suspension is required at a reduced size, weight, and cost. They depend on the integrity of their seals, their ability to dissipate heat, and their spring rate at and near the static position to maintain the height and attitude of the vehicle despite changes in the ambient and operating conditions.

One such in-arm unit is set forth in co-pending U.S. Ser. No. 361,944, filed Mar. 25, 1982 now U.S. Pat. No. 4,447,073 and assigned to the same assignee. The in-arm pneumatic spring produces an output force for each vertical position of the road wheel as a function of the initial gas volume and pressure; the adiabatic expansion or contraction of this gas volume; the road arm geometry; and the non-linear mechanism which controls in response to road arm displacement both the effective arm length at which the pneumatic forces act and the displacement of the piston which varies the gas volume. The resultant shaped spring characteristic provides improved static and dynamic suspension system performance. An in-spindle damper is located remotely from the gas volume and is operated independently of the spring mechanism. A non-linear cam which is an integral part of a rotating crankcase housing actuates a piston pump which increases crankcase fluid to a pressure which is a function of the road arm's direction of rotation, displacement, and velocity; and of the pressure-flow characteristics of the hydraulic control system components. The in-spindle damper absorbs energy as a function of this pressure and the friction characteristics at various road arm velocities of the rotary damper. The resultant shaped damper characteristic provides improved dynamic suspension system performance.

The heat generated by the friction damper is transferred to crankcase fluid which is pumped through the damper via integral hydraulic components. This heat is then transferred by the circulating fluid to the large mass and area crankcase housing and then to the surrounding atmosphere, and to the large mass spindle and directly through the large area mounting flange to the vehicle hull; thus, efficiently absorbing and dissipating the heat, minimizing the temperature build-up, and isolating the pneumatic spring from the effects of varying excessive operating temperatures. The spring has a piston which is operated by a slider crank mechanism to vary compression of a trapped volume of gas. The seal assembly for the gas volume is carried by the piston and seals the high pressure gas directly.

An object of the present invention is to provide an improved lubricated seal system for the gas spring of an in-arm pneumatic suspension unit; the seal system having a gravity oriented oil barrier that lubricates a set of seals and traps a gas volume behind the oil barrier so that it is displaced by a slider crank positioned rod to compress the gas volume.

Another object of the present invention is to provide an in-arm hydropneumatic suspension unit with a slider crank positioned rod relatively positioned within a road arm which carries a set of seals fixed therein to relatively slide with respect to and seal the outer surface of the rod; the road arm has an oil volume disposed and oriented by gravity to a position which submerges the set of seals within an oil barrier that is interposed between a rod displacement cavity and a high pressure gas spring volume within the road arm to trap the gas behind the oil so as to isolate the set of seals from the gas volume and whereby the rod will be sealed within the oil barrier and will displace the oil barrier to vary the gas volume to vary the load capacity of the suspension unit.

Yet another object of the present invention is to provide an in-arm seal assembly for a pneumatic vehicle suspension unit having relatively positioned rod and seal assembly components arranged to have a gravity flow defined oil/gas barrier submerging the rod end and seal assembly within an end cavity of the suspension arm and wherein the rod end displaces oil from the cavity to vary gas pressure loading on the rod which acts directly from a gas volume across the oil barrier to produce a load equalizing force on the rod.

These and other objects of the present invention will be more apparent with reference to the following description and drawings of a preferred embodiment of the invention wherein:

FIG. 1 is a side elevation view of a tracked vehicle with a road wheel suspension system including the present invention;

FIG. 2 is a front elevation view of a road arm including the present invention;

FIG. 3 is a side elevation view looking in the direction of arrow III in FIG. 2;

Figure 4:
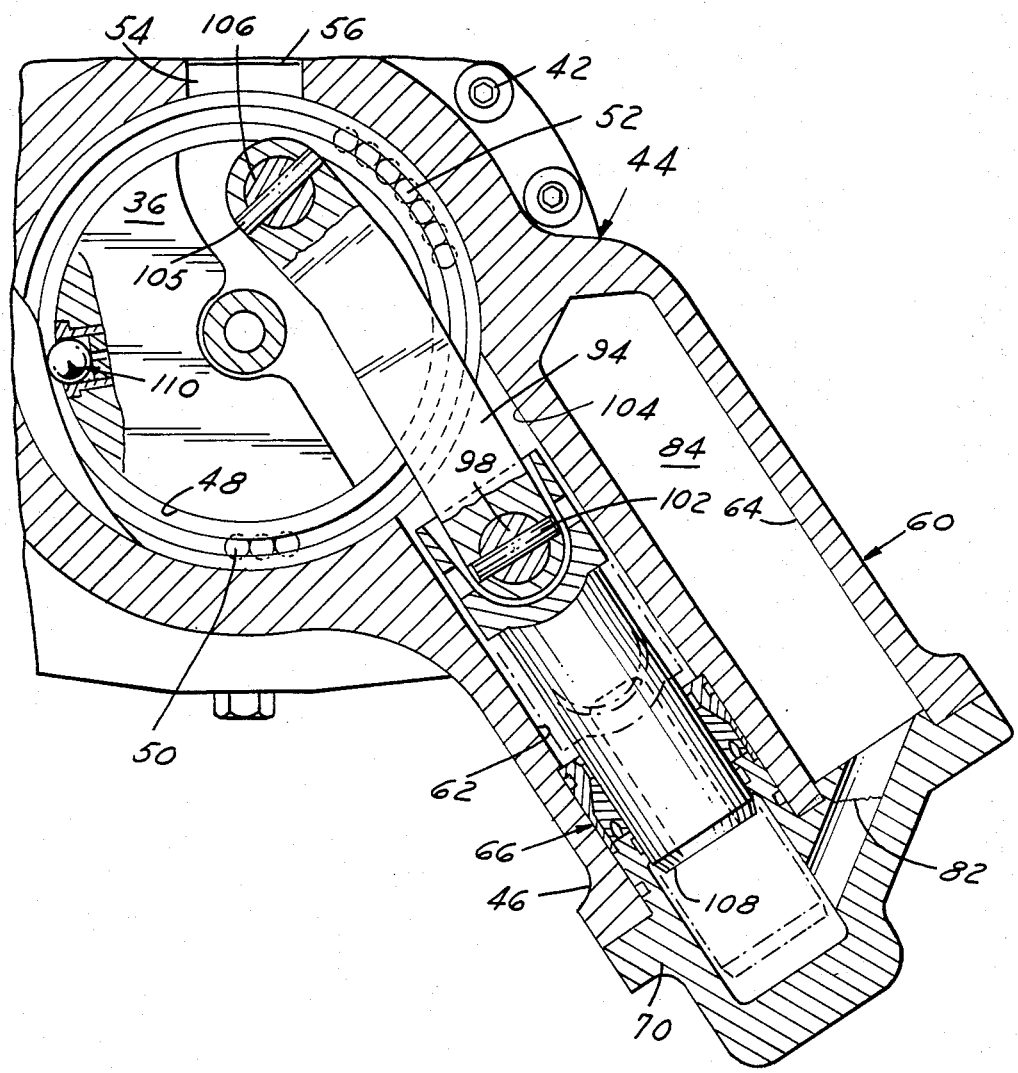
FIG. 4 is a partial sectional view taken along the line IV—IV of FIG. 2 looking in the direction of the arrows showing a piston rod in a static position.

Referring now to FIG. 1, an armored vehicle 10 is illustrated. It includes two track laying systems 12 only one of which is shown. The system 12 includes a track 14 guided over an idler wheel 16 and a drive sprocket 18. A plurality of support rollers 20 guide the upper reach of the track. The vehicle is suspended by a plurality of road wheels 22, spaced axially along the side wall 24 of the vehicle hull 26. Each road wheel 22 is carried for vertical movement with respect to the hull by a self-contained, externally mounted hydropneumatic suspension unit 28, hereinafter HSU 28. An adjustable track tensioner 30 is coupled between a compensating idler arm 32 and a spindle housing 34 of the forward-most HSU or is hull mounted.

The systems 12 are representative of track laying systems improved by the present invention which is equally suitable for use on other track systems or on wheeled vehicles.

Each HSU 28, as shown in FIG. 2 and FIG. 3, is fixedly secured to the vehicle hull 26 by a large diameter road arm spindle 36 having both a registering diameter 38 and a mounting flange 40 with a plurality of bolts 42 threaded to hull 26. The diameter of the spindle 36 is selected for purposes which will become more apparent in the text of the aforesaid application and is larger than diameters used in prior HSU assemblies.

A road arm 44 having the spindle housing 34 at one end and a road wheel spindle 45 at the other free end 46 is supported for oscillation on the large outer diameter surface 48 of spindle 36 by complementary tapered roller bearings 50,52. The large diameter but small cross-section preloaded full complement tapered roller bearings 50,52 support the road arm both axially and radially in a construction having a minimum volume and a narrow width.

A crankcase 54 is defined by the free volume enclosed within the spindle housing 34 and within the spindle 36. The crankcase is filled with fluid to the level indicated at reference numeral 56.

Figure 5:
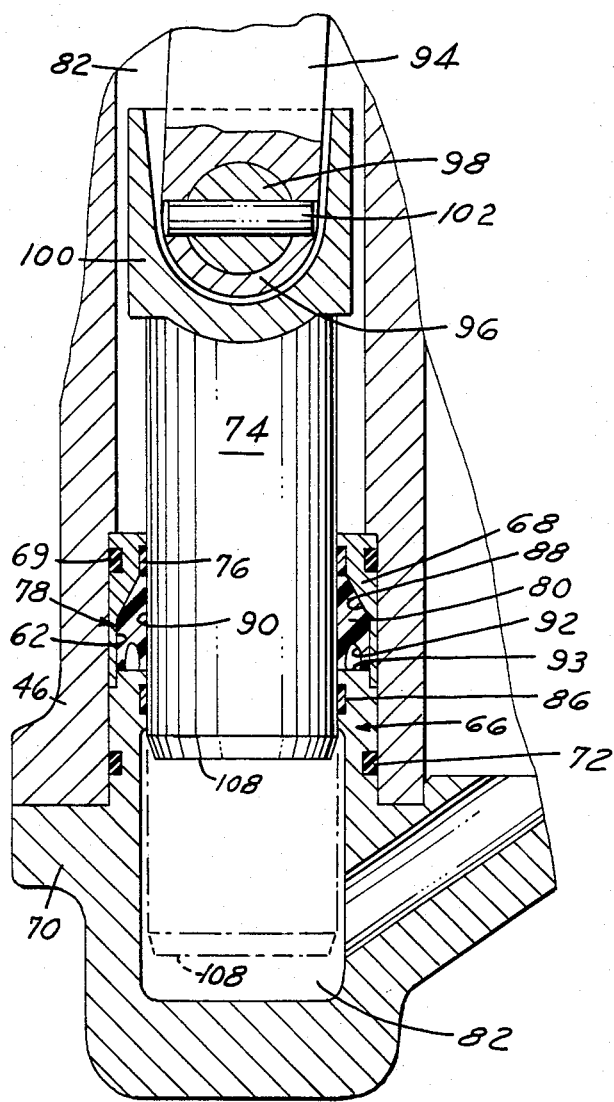
FIG. 5 is an enlarged fragmentary sectional view of a piston rod seal assembly.

A mechanically operated, single chamber gas spring 60, as shown in FIGS. 4 and 5 having spaced bores 62, 64 is included in the road arm 44. This spring supports that portion of the sprung mass of vehicle 10 that acts at the described road wheel station. A charging valve 63 and relief valve 65 are located on road arm 44 to supply nitrogen gas to bore 64 and to relieve excessive gas pressure in the unit.

In accordance with certain principles of the present invention, a seal assembly 66 is axially located within oil filled bore 62. Assembly 66 includes an inboard seal support sleeve 68 seated in bore 62 at the free end 46 of road arm 44 and sealed with respect thereto by an O-ring seal 69. The support sleeve 68 is held at one end by a cylinder head 70 with an annular O-ring 72 therein that seals against the arm 44. A piston rod 74 is supported in support sleeve 68 by a glide ring 76. A piston rod seal 78 has a cone-shaped end 80 seated on support sleeve 68 to seal rod 74 in a gravity defined oil barrier 82 which submerges the seal assembly 66 and traps gas in chamber 84 to produce an initial static pressure in gas spring 60. The free end of rod 74 is guided by a glide ring 86 on head 70. Rod seal 78 is wedged by a tapered surface 88 on support sleeve 68 radially inwardly toward the O.D. surface 90 of rod 74. Rod seal 78 also includes a recessed end surface 92 that yields to pack the interface 93 between support sleeve 68 and cylinder head 70.

As best seen in FIGS. 4 and 5, a connecting bar 94 has end 96 fastened to piston rod 74 by wrist pin 98 at piston rod end 100. A pin 102 connects wrist pin 98 to end 96. The bar 94 passes through a rectangular slot 104 located between spindle housing walls at the closed end of bore 62.

The other end of connecting bar 94 is fastened by a pin 105 to crank shaft 106.

The initial static pressure ($P_s$) in gas spring operating on face 108 of piston rod 74 produces a force (F) which is transmitted by connecting bar 94 to spindle 36. The amplitude of this force is equal to the product of the pressure (P), the area of face 108 (A), and the cosine of the angle $\alpha$ (cos $\alpha$) included between the centerline of piston rod 74 and the centerline of bar 94 (as shown HSU 28 has been designed so that angle $\alpha$ equals zero degrees at the static position) or:

$$F = P_s A \cos \alpha \quad (1)$$

The direction of this force is along the centerline of bar 94.

This force acts at an effective radius ($r_1$) which is the perpendicular distance between the centerline of bearings 50,52 and the centerline of bar 94 to produce a moment around the centerline of the bearings. An equal and opposite moment reacts on road arm 44. The vertical sprung weight ($F_v$) of vehicle 10 acts at the described HSU 28 at an effective radius ($r_2$) which is the horizontal distance between the centerline of bearings 50,52 and the centerline of a wheel spindle 45 on free end 46 to produce a second moment about bearings 50,52. Equating these moments to zero and solving for Fv yields:

$$F_v = \frac{PA \cos \alpha \, r_1}{r_2} \quad (2)$$

The volume of gas spring chamber 84 at any road arm position is equal to the initial volume ($V_s$) at the static position (S) in FIG. 4 plus or minus the displacement of ($X_p$) of piston rod 74 times its area A or:

$$V = V_s \pm X_p A \quad (3)$$

The pressure that corresponds to this volume is determined by the adiabatic expansion or compression of gas in the variable volume chamber 84 or:

$$P = P_s \left( \frac{V_s}{V} \right)^\gamma \quad (4)$$

Where the factor $\gamma$ is the ratio of the specific heat of the selected gas at constant volume to the specific heat at constant pressure values are available in published tables. For all displacements of the road arm the piston rod displacement ($X_p$), the angle ($\alpha$), the effective connecting bar radius ($r_1$), and the effective road arm radius ($r_2$) may be determined by graphical or numerical means. Substituting these values in equations (2), (3), and (4) will permit the vertical force ($F_v$) to be calculated for each displacement.

In the past, damping systems of conventional in-arm suspension units have used restrictions to the flow of fluid between the fluid piston and the gas/fluid separator of a hydropneumatic spring to damp the vehicle oscillations as a function of piston direction of motion and velocity. Such restrictions absorb energy from the system and convert this energy to heat. The heat which is generated has to be dissipated to the surrounding atmosphere from the limited surface area of the arm (which may be caked with dried mud). The resultant increase in temperature causes increases in the fluid volume and the gas pressure which adversely affect the vehicle's height and attitude.

The present invention has a hydraulically controlled rotary friction damper system 110 more specifically described in co-pending U.S. Ser. No. 361,994, filed Mar. 25, 1982, now U.S. Pat. No. 4,447,073. System 110 is located remote from gas spring 60 in spindle 36, and operated independently of the spring drive mechanism and damps the vehicle oscillations as a function of road arm 44 direction of rotation, displacement, and velocity, pressure-flow characteristics of the hydraulic control system and friction-velocity characteristics of a rotary damper. Damper system 110 provides improved dynamic suspension system performance without the heat dissipation problem of conventional in-arm systems.

Since the seal assembly 66 is submerged at all times and remote from damper produced heat, the glide rings 76, 86 and rod seal 78 have long life and do not have to seal directly against a gas volume. Thus the present invention is a dynamic gas (preferably nitrogen) rod sealing system which employs standard seal components whose function is enhanced by use of a gravity oriented oil barrier of unique configuration to seal between a high pressure oil region (oil barrier 82) and a lower pressure oil region (crankcase 54).

Figure 6:
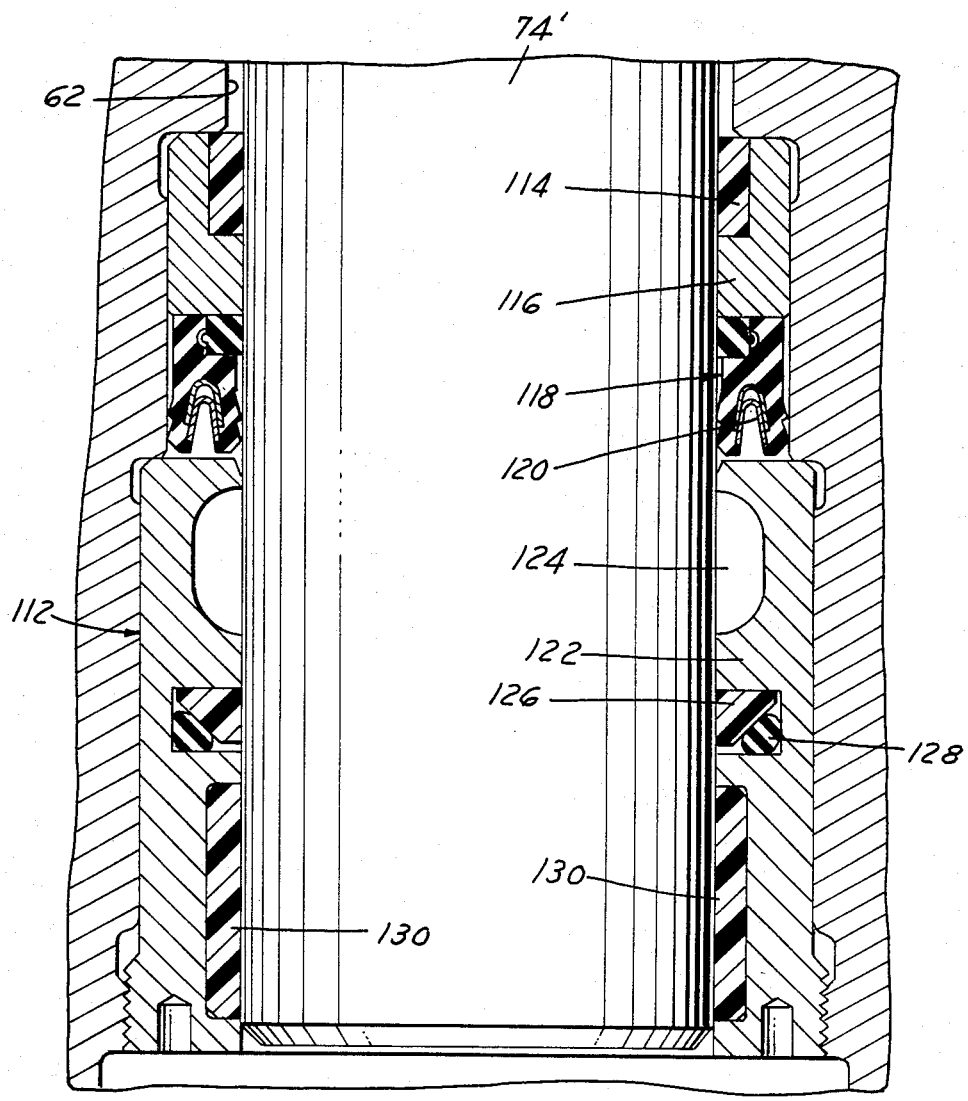
FIG. 6 is a sectional view of another embodiment of a piston rod seal assembly.

Another embodiment of an oil submerged seal is illustrated in FIG. 6. A rod seal assembly 112 located in bore 62' includes a guide ring 114 in a support collar 116 to support a rod 74'. A piston rod seal 118 engages collar 116 and includes internal spring clips 120 that forces the seal 118 into sealing engagement with the O.D. of rod 74' and the wall of bore 62'. A second seal support 122 has a snubber cavity 24 that attenuates the sealed oil pressure at seal 118. A floating rod seal 126 in support 122 is pressured upwardly as viewed in FIG. 6 when the piston rod 74' is stroked downwardly. The seal 126 includes an O-ring 128. The support 122 also carries a glide ring 130 at its opposite end. The seal assembly 122 defines a dynamic, oil submerged seal for associated with the aforedescribed gravity oriented oil barrier arrangement to seal between a high pressure oil region and a lower pressure oil region.

While the embodiment of the present invention, as herein disclosed, constitutes a preferred form, it is to be understood that other forms might be adopted.

The embodiments of the invention in which an exclusive property or privilege is claimed are defined as follows:

What is claimed is:

1. A self-contained road wheel suspension system comprising in combination, a spindle fixedly secured to a vehicle hull, a unitary road arm having a spindle housing on one end and a road wheel support on the opposite end thereof, bearing means for supporting said spindle housing for rotation relative to said spindle, means defining a single chamber gas spring means at the opposite end of said arm, and a fluid controlled damper means included within said spindle, said spring means including a gas volume and a piston rod relatively reciprocated with respect to said arm, seal assembly means carried by said arm, means defining a low pressure oil region on one end of said piston rod and means defining a high pressure oil region on the opposite end of said piston rod to submerge said seal assembly in oil and separate it from the gas volume, said rod displacing said high pressure oil region to vary the gas volume pressure.

2. In the self-contained road wheel suspension system of claim 1, said gas spring means including a piston rod operated variable gas volume in said road arm, a drive means including first connecting means at said large diameter spindle and second connection means at said piston rod, said drive means varying non-linearly in response to vertical displacement of said road wheel so as to cause both the displacement of said piston rod and the effective radius at which the forces exerted by said piston act, to produce, in conjunction with the adiabatic expansion or contraction of the gas in said gas volume chamber, and the geometry of said road arm, a shaped spring characteristics.

3. A self-contained road wheel suspension system comprising in combination, a large diameter spindle fixedly secured to a vehicle hull, a road arm having a spindle housing on one end and a road wheel support on the opposite end thereof, bearing means for supporting said spindle housing for rotation relative to said spindle, a fluid filled crankcase defined by said spindle housing and said spindle, mechanically operated single chamber gas spring means at the opposite end of said road arm, a mechanically operated fluid controlled damper means remote from said gas spring means and included within said spindle, means for removing heat from said damper means, and means for absorbing and dissipating said heat without adversely affecting the performance of said gas spring means, said spring means including a gas volume and a piston rod relatively reciprocated with respect to said arm, seal assembly means carried by said arm, means including said fluid filled crankcase defining a low pressure oil region on one end of said piston rod and means defining a high pressure oil region on the opposite end of said piston rod to submerge the seal assembly in a volume of oil which separates said seal assembly from the gas volume, said rod displacing said high pressure oil region to vary the gas volume pressure.

4. In the combination of claim 3, drive means including a connecting bar, first connecting means at said spindle including a crank pin, second connecting means at said piston rod including a wrist pin, said seal assembly means including seal support sleeve means supported on said arm at a first bore therein, a cylinder head seal support located in said bore for holding said seal support sleeve means axially of said bore and a piston rod seal interposed between said seal support sleeve means and said cylinder head engaging the outer surface of said piston rod, said low and high pressure oil regions submerging said seal support sleeve means, said piston rod seal and said cylinder head, and means forming a gas volume in said single chamber gas spring means, said high pressure oil region being displaced without flow restriction to and from said bore to vary the gas volume pressure.

5. In the combination of claim 3, said seal assembly including a completely oil submerged piston rod seal and means biasing said piston rod seal against the O.D. of said piston rod to define an oil sealed surface on said piston rod to separate said high pressure oil region from said lower pressure oil region.

6. In the combination of claim 3, said seal assembly including a completely oil submerged piston rod seal including means biasing said piston rod seal against the O.D. of said piston rod to define an oil sealed surface on said piston rod, snubber cavity means to attenuate oil pressure at said oil sealed surface, said snubber cavity means and said piston rod seal separating a high pressure oil region from a lower pressure oil region.

* * * * *